(12) United States Patent  
Moraes et al.

(10) Patent No.: US 7,761,525 B2
(45) Date of Patent: Jul. 20, 2010

(54) SYSTEM AND METHOD FOR PROVIDING IMPROVED TIME REFERENCES IN DOCUMENTS

(75) Inventors: Francisco Inacio Moraes, Cary, NC (US); William Augustus Parvin, III, Fuquay-Varina, NC (US); Dean Merritt West, II, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/844,258

(22) Filed: Aug. 23, 2007

(65) Prior Publication Data

US 2009/0055487 A1 Feb. 26, 2009

(51) Int. Cl.
G06F 15/16 (2006.01)
(52) U.S. Cl. ....................... 709/206; 709/204
(58) Field of Classification Search ......... 709/204–207; 715/260, 267, 249, 250, 256
See application file for complete search history.

(56) References Cited

U.S. PATENT DOCUMENTS

| 5,600,836 | A | * | 2/1997 | Alter | 707/101 |
| 5,822,523 | A | * | 10/1998 | Rothschild et al. | 709/236 |
| 5,872,926 | A | * | 2/1999 | Levac et al. | 709/206 |
| 6,016,478 | A | * | 1/2000 | Zhang et al. | 705/9 |
| 6,339,790 | B1 | * | 1/2002 | Inoue | 709/224 |
| 7,340,264 | B2 | * | 3/2008 | Islam et al. | 455/466 |
| 2001/0032175 | A1 | * | 10/2001 | Holden et al. | 705/37 |
| 2002/0107811 | A1 | * | 8/2002 | Jain et al. | 705/64 |
| 2003/0022679 | A1 | * | 1/2003 | Chen et al. | 455/502 |
| 2004/0122900 | A1 | * | 6/2004 | Pous et al. | 709/206 |
| 2005/0114768 | A1 | * | 5/2005 | Atkin et al. | 715/530 |
| 2006/0136121 | A1 | * | 6/2006 | Eisen | 701/200 |
| 2007/0112920 | A1 | * | 5/2007 | Hay | 709/206 |

* cited by examiner

*Primary Examiner*—Faruk Hamza
(74) *Attorney, Agent, or Firm*—VanLeeuwen & VanLeeuwen

(57) ABSTRACT

A system, method, and program product is provided that receives, at a recipient's computer system, an email message from a sender's computer system with the email message including a time offset value in a metadata area of the email message. The time offset indicates an offset between the time zone that is used at the sender's computer system and a base time zone. A total time offset value is computed based on the received time offset value and the time zone used that is used at the recipient's computer system. Time notations that have been included in a body area of the email message are converted to the second time zone by applying the computed total time offset value to the time notations. The converted time notations are displayed, along with the body area of the email message, on a display device.

8 Claims, 6 Drawing Sheets

SYSTEM AND METHOD FOR PROVIDING IMPROVED TIME REFERENCES IN DOCUMENTS

BACKGROUND OF THE INVENTION

1. Technical Field

The present invention relates to a system and method that improves time references in documents. More particularly, the present invention relates to a system and method that improves referencing time notations in electronic documents, such as email messages, when participants are in different time zones.

2. Description of the Related Art

Email messages are an important communication tool used in businesses and many other organizations. Email allows users to communicate with others that are in different parts of the world at little expense. A further advantage of email messages is that, unlike traditional telephone conversations, the recipient can choose when to open and read an email message. While email messages are extremely helpful in aiding communication amongst email users, traditional email messages face particular challenges.

One challenge faced by traditional email systems is the reference of time in email messages. If a user in the Eastern Time (ET) Zone sends a message to a recipient in the Central Time (CT) Zone indicating that a tele-conference will be conducted at 2:00 PM, the recipient may be confused as to whether the call is at 2:00 PM ET or 2:00 PM CT. While the sender may indicate the time zone (e.g., "the teleconference will be held at 2:00 PM ET"), the recipient is still often faced with trying to figure out how many hours are between the time zones. This problem is exacerbated when users are in various parts of the world where the time zone difference is greater than one or two hours. If the recipient does not calculate or understand the correct time, the recipient may not realize when the event (e.g., the teleconference) is occurring and result in missing the event. This challenge is again exacerbated when multiple recipients are invited to an event such as a teleconference and the result of one or more recipients missing the event is that the event is canceled or cannot be conducted as intended.

FIG. 3 depicts an example of the challenges faced in the prior art using a traditional email system. Email originator 310 is in the Eastern Time (ET) Zone and sends an email message via computer network 200 indicating that a conference call is at 2:00 PM. Recipients 320 and 330 are in the Central Time (CT) Zone and the Pacific Time (PT) Zone and receive the same message indicting that the conference call will be held at 2:00 PM. However, without further information, recipients 320 and 330 do not know if the conference call will be held at 2:00 PM Eastern Time or if the call is at 2:00 PM in their respective time zones. A misunderstanding in this regard likely results in one or both of the recipients failing to join the conference call at the appointed time.

SUMMARY

It has been discovered that the aforementioned challenges are resolved using a system, method and computer program product that receives, at a recipient's computer system, an email message from a sender's computer system with the email message including a time offset value in a metadata area of the email message. The time offset indicates an offset between the time zone that is used at the sender's computer system and a base time zone. A total time offset value is computed based on the received time offset value and the time zone used that is used at the recipient's computer system.

Next, one or more time notations that have been included in a body area of the email message are converted to the second time zone by applying the computed total time offset value to the time notations. Finally, the converted time notations are displayed, along with the body area of the email message, on a display device attached to the recipient's computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
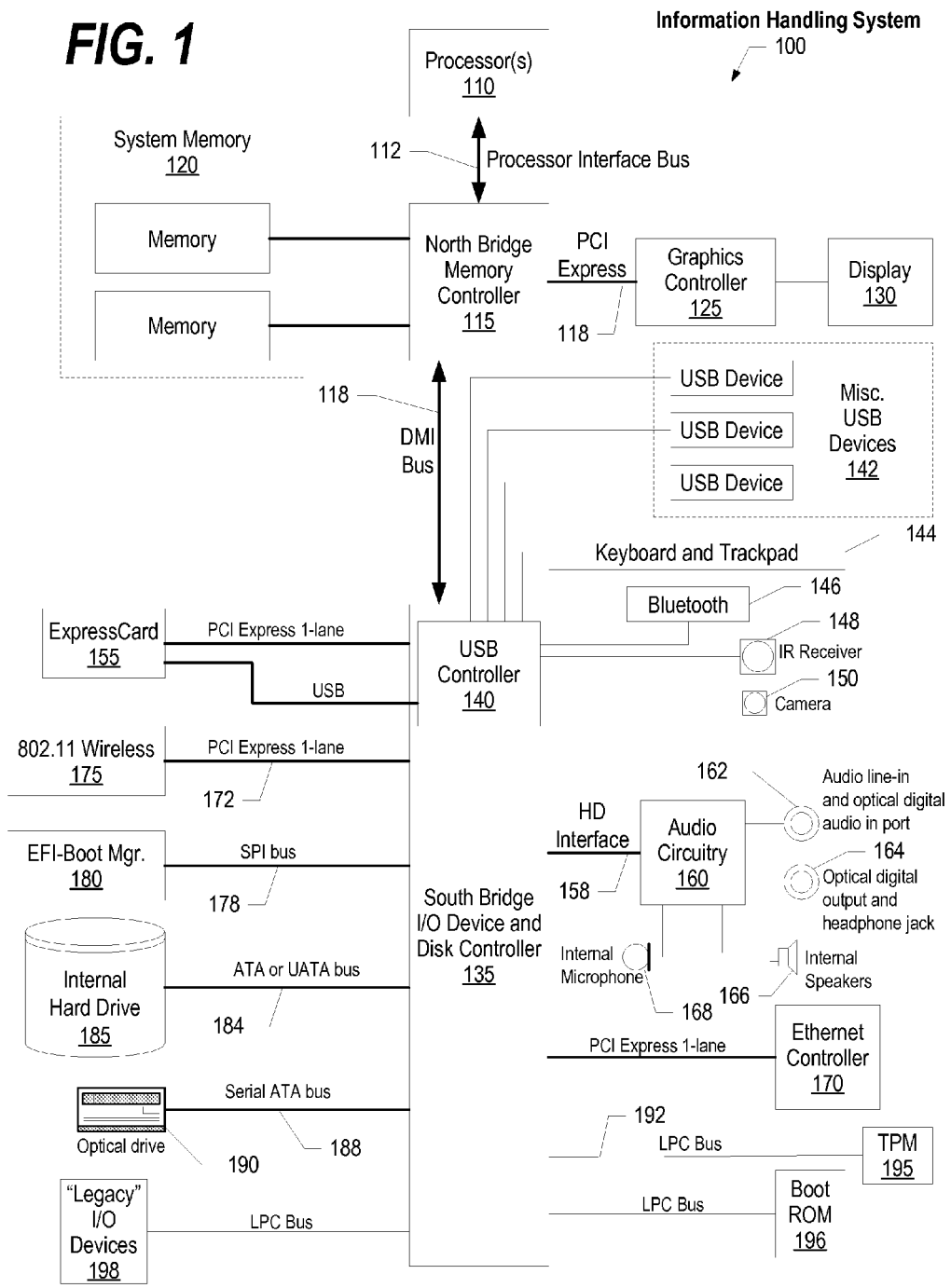
FIG. 1 is a block diagram of a data processing system in which the methods described herein can be implemented.
Figure 2:
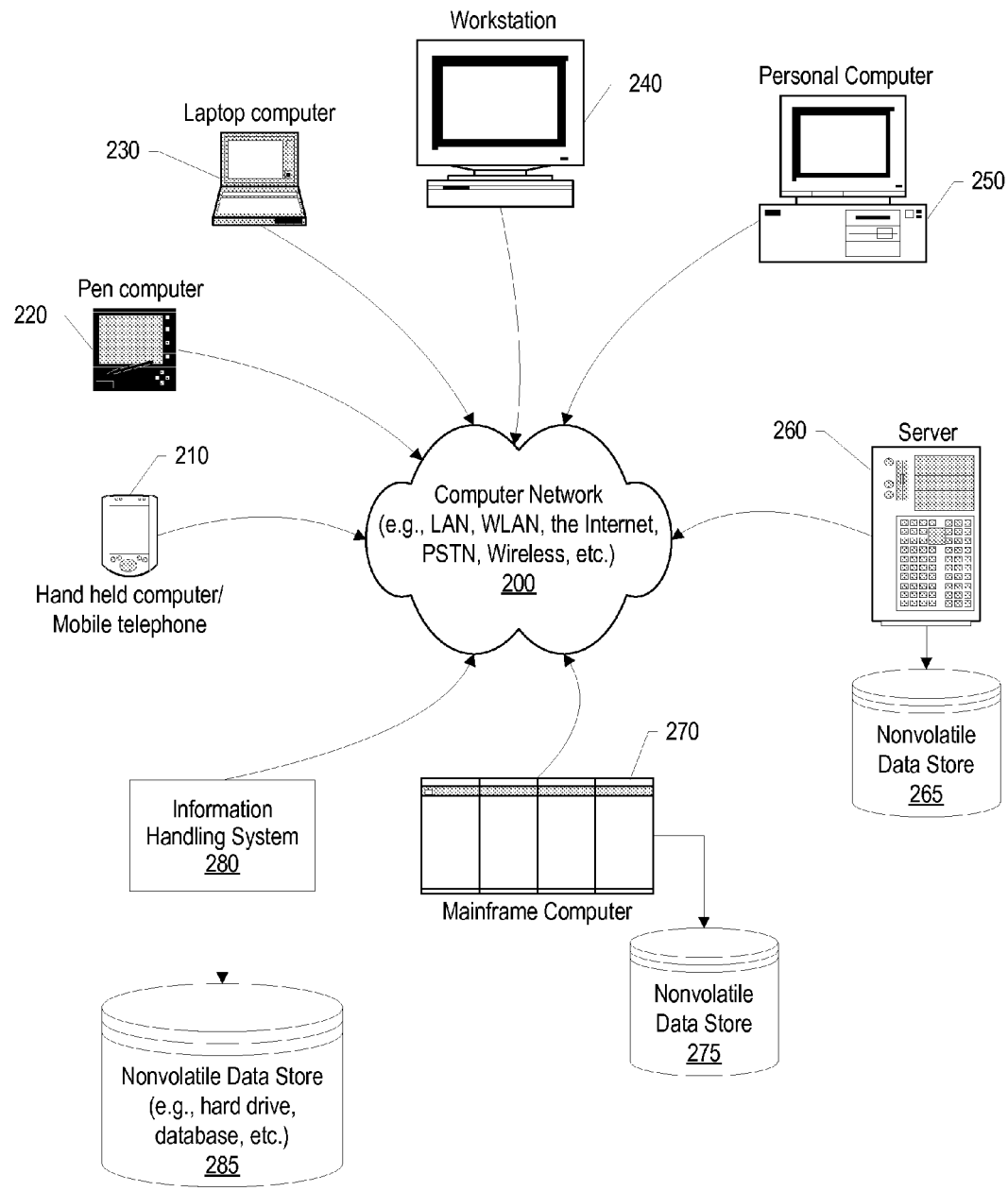
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
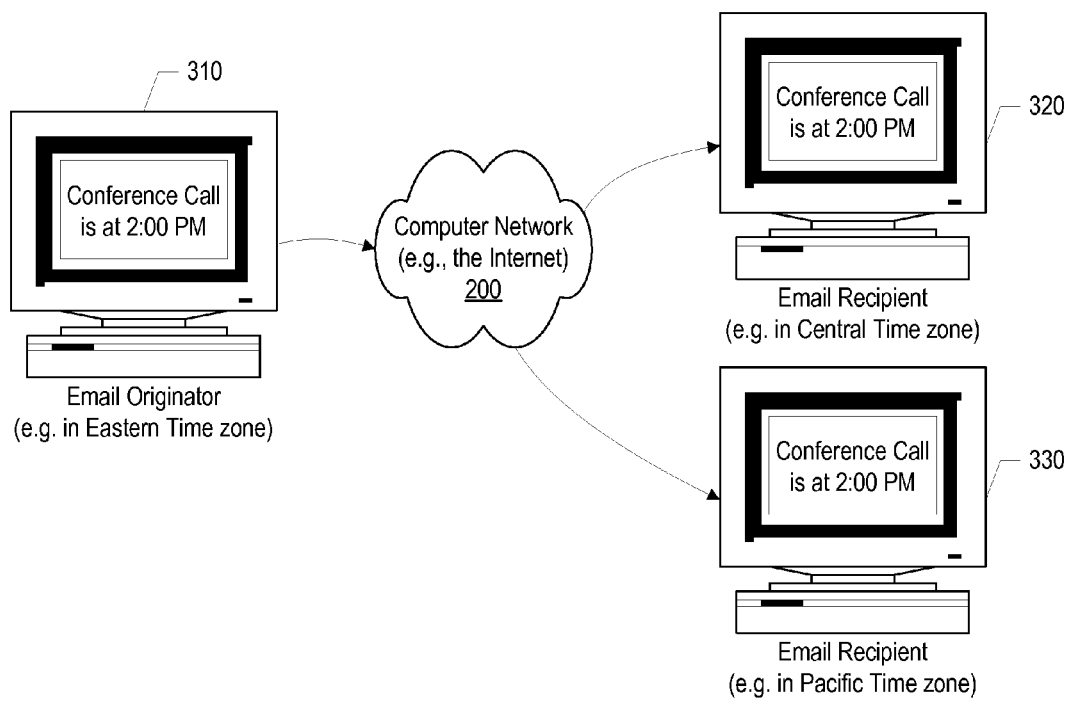
FIG. 3 is a prior art diagram, described in the Background Section, that outlines challenges faced by traditional email systems when communicating time-based events.

FIG. 3 is a prior art diagram, described in the Background Section above, that outlines challenges faced by traditional email systems when communicating time-based events.

Figure 4:
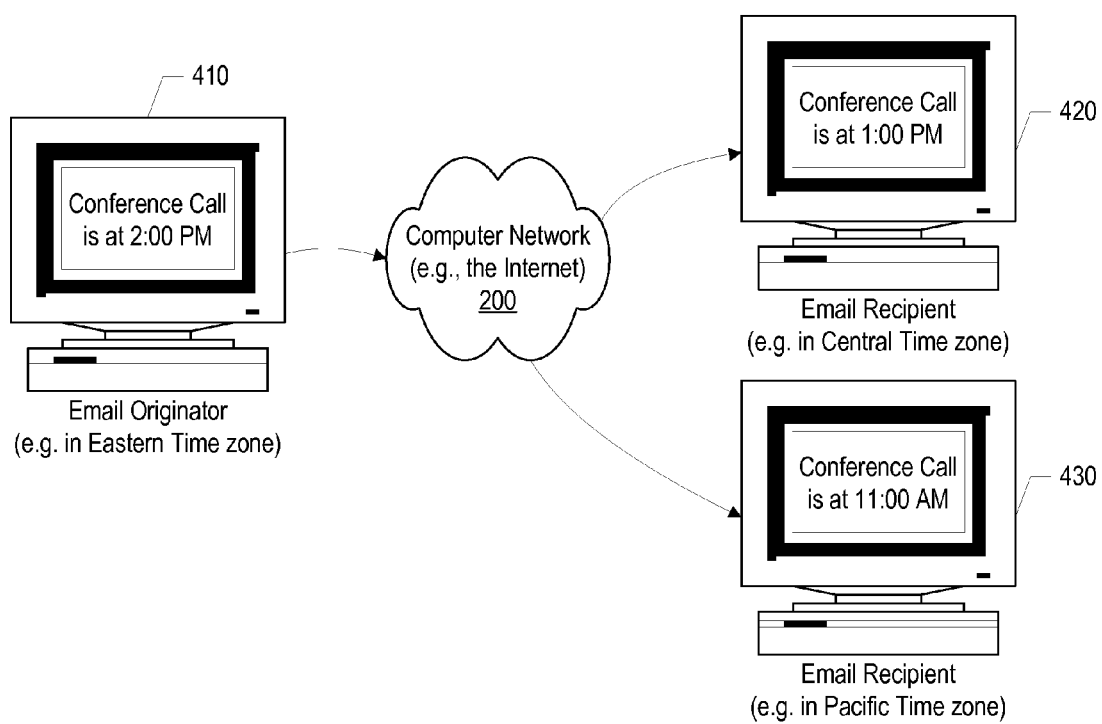
FIG. 4 is a diagram similar to FIG. 3 but showing how the present invention accurately communicates the time that a time-based event is taking place.

FIG. 4 is a diagram similar to FIG. 3 but showing how the present invention accurately communicates the time that a time-based event is taking place. In contrast to the prior art's handling of the email message, in FIG. 4, email originator 410 creates an email message noting information about a particular event. In the example shown, the email originator (email sender) is in the Eastern Time Zone (ET) and has prepared an email message indicating that a conference call will be held at 2:00 PM. The email message is sent through computer network 200, such as the Internet, to email recipients 420 and 430. In the example shown, email recipient 420 is in the Central Time Zone (CT) and email recipient 430 is in the Pacific Time Zone (PT). Using the methods and techniques described herein, the time encoded in the sender's email message is converted to reflect the time zone used by the respective recipient. In the example shown, the conference call is shown to be scheduled at 1:00 PM for recipient 420 that is in the Central Time Zone and is shown being scheduled at 11:00 AM for recipient 430 that is in the Pacific Time Zone because the Central Time Zone is one hour behind the Eastern Time Zone and the Pacific Time Zone is three hours behind the Eastern Time Zone. In this manner, using the techniques described herein, all parties to the conference have been informed of the correct local time and are less likely to miss the conference call. This is in sharp contrast to the prior art method, previously shown in FIG. 3, where all email messages noted that the conference call would take place at 2:00 PM and did not account for differences in time zones between the sender's computer system and the recipients' computer systems.

Figure 5:
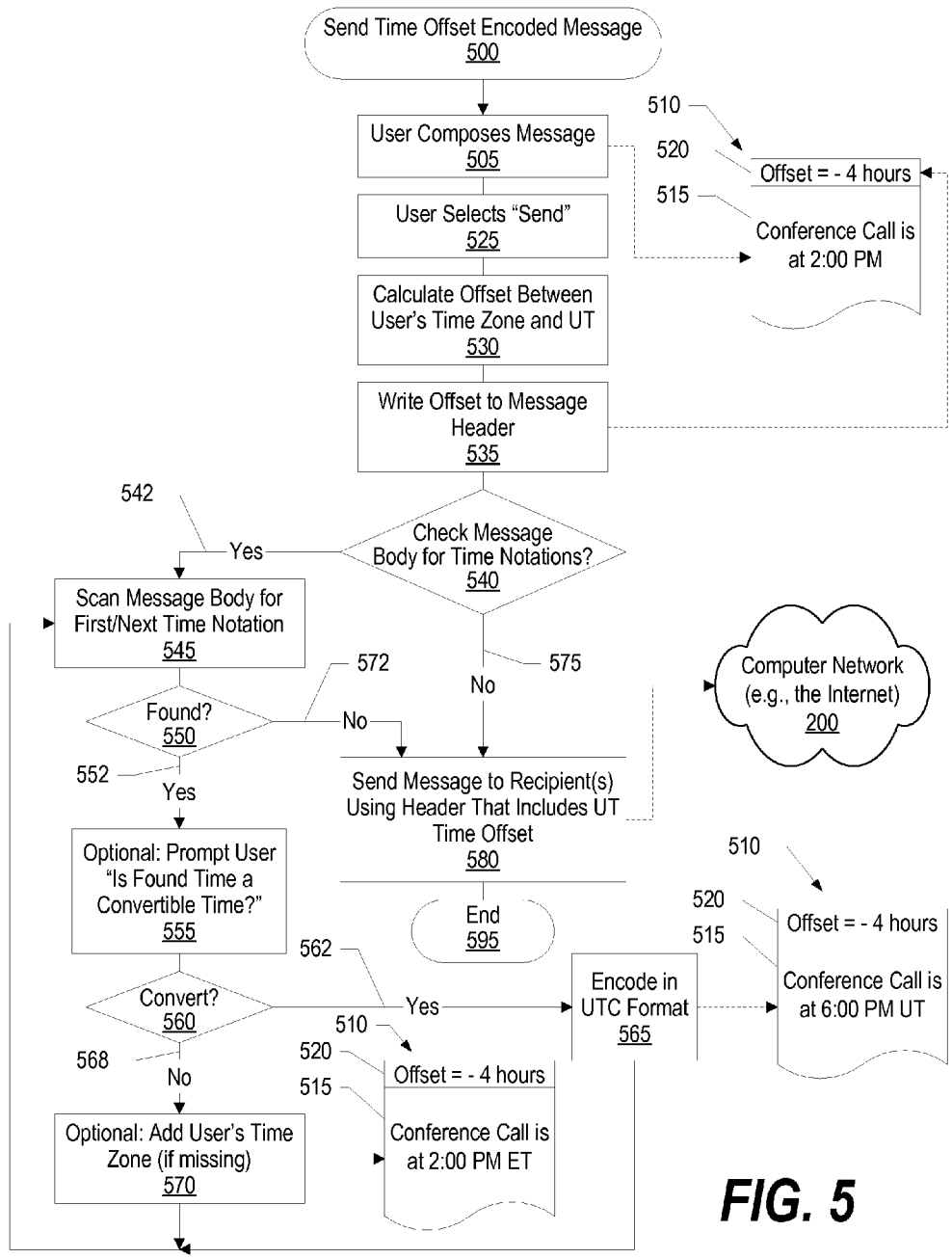
FIG. 5 is a flowchart showing steps taken to send a time-offset encoded email message.

FIG. 5 is a flowchart showing steps taken to send a time-offset encoded email message. Processing used to send a time offset encoded email messages commences at 500 whereupon, at step 505, the sender composes body 515 of email message 510. Email message 510 includes two major areas, namely email body area 515 and email metadata area 520. As the names imply, the email body area is the area where the message text composed by the email creator (email sender) is stored and the email metadata area is the area where information about the email message is stored. In many email implementations, the metadata area is a header that is included with the email message.

In one embodiment, shown here, the system waits until the sender selects to send the email message before scanning the message for time notations. As will be appreciated by those skilled in the art, the conversion of time notations can take place at any time after the time notations have been entered by the user. For example, the time notations can be scanned as the user types the email body text and convert time notations that are entered by the user as soon as the time notations are entered, rather than waiting until the user requests to send the email message.

At step 530, a time offset is calculated between the time zone being used by the sender's computer system and a base time zone. In one embodiment, the base time zone is Universal Time (GMT). At step 535, the time offset is written to the metadata area (e.g., the email header). In the example shown, the user is in the Eastern Time Zone and the time offset between the Eastern Time Zone and Universal Time is negative four (−4) hours. In other words, when it is 2:00 PM in the Eastern Time Zone, Universal Time is 6:00 PM, a difference of −4 hours.

A determination is made as to whether to check email body area 515 for time notations (decision 540). In one embodiment, decision 540 is encountered based on a user preference (e.g., configuration setting) that indicates whether the user wishes email messages to be scanned for time notations. In another, or further, embodiment, decision 540 is encountered using a prompt, such as a pop-up window that asks the user whether to check the message that is about to be scanned for time notations. If the email message body is being scanned for time notations, then decision 540 branches to "yes" branch 542 to process the email body.

At step 545 email message body 515 is scanned for the first occurrence of a possible time notation. A time notation is a user-encoded textual reference that refers to a particular time. In one embodiment, time notations are found by scanning the text in the email body for "AM" or "PM" notations. In a further embodiment, time notations are found by scanning the text for numeric data separated by a colon (:). In this manner, if a user indicated that a teleconference would be held at 1:00 (without noting "AM" or "PM") the notation of 1:00 would be noted as a time of day. Likewise, if the user noted a time of day as 1 PM (without using a colon separating the time, such as 1:00 PM), then the "1 PM" would also be recognized as a time notation. A determination is made as to whether a first time notation is found in the message body (decision 550). If a time notation is found in the message body, then decision 550 branches to "yes" branch 552 whereupon, an optional step 555 is performed that prompts the user as to whether the found time notation is a convertible time (e.g., should the time be changed based upon the recipient's time zone). In one embodiment, step 555 is performed based upon a user preference (e.g. configuration setting) that indicates that the user wishes to select which times are convertible rather than converting all found time notations. A determination is made as to whether to convert the found time notation (decision 560). If the time notation is a convertible time, then decision 560 branches to "yes" branch 562 whereupon, at step 565, the found time notation is encoded in a Coordinated Universal Time (UTC) format. Time zones around the world are expressed as positive or negative offsets from UTC. Local time is UTC plus the time zone offset for that location. As the zero-point reference, UTC is also referred to as Zulu time (Z). In the example shown, the message body of a "2:00 PM" conference call in the Eastern Time Zone is converted to a "6:00 PM UT" conference call. Universal Time (UT) is a timescale based on the rotation of the Earth. It is a modern continuation of the Greenwich Mean Time (GMT), i.e., the mean solar time on the meridian of Greenwich, England, which is the conventional 0-meridian for geographic longitude. In one embodiment, the character location of the convertible time within the message text (i.e., the number of characters from the beginning of the message text where the convertible time is located) is stored. These character locations are referred to the "character offset values" and, when processed by the receiver, are used to identify the character locations of the time notations found in the email message. For example, if the message text reads "Hello, the meeting will be at 2007-08-21T08:00:00Z on Central Park." then the convertible time notation ("2007-08-21T08:00:00Z") is located 30 characters into the message. A corresponding character offset value would be generated such as "Character-Time-Offsets: 30." If additional convertible times are located, then the offsets of these other times are appended to the location offset (e.g., "Character-Time-Offsets: 30, 59, 234"

would be the character offset values if three convertible times were located in the message beginning at the 30$^{th}$ character, 59$^{th}$ character, and 234$^{th}$ character of the email message).

Returning to decision 560, if the found time notation is not being converted to a UTC format, then decision 560 branches to "no" branch 568 whereupon, optional step 570 is performed to add the user's time zone to the message if a time zone is missing from the time notation. Again, in one embodiment, the execution of step 570 is based upon a user preference (e.g., configuration setting). If step 570 is performed and the user (in the Eastern Time Zone) entered "2:00" or "2 PM" then the time notation would be changed to "2:00 PM ET" to indicate a more accurate time description. After steps 565 or 570 are performed, processing loops back to step 545 to scan the message body for a next time notation. If found, the next time notation is processed as described above. This processing continues until no further time notations are found, at which point decision 560 branches to "no" branch 572 exiting the loop.

If the message body is not being checked for time notations (decision 540 branching to "no" branch 575) or when all time notations have been scanned and processed (decision 550 branching to "no" branch 572), then, at step 580, the email message is sent from the sender to one or more recipients via computer network 200, such as the Internet. The message that is sent includes email message metadata (e.g., a header) that includes the time offset between the time zone used at the sender's computer system and a base time zone, such as Universal Time (UT). In addition, the character offsets of the located convertible times (e.g., "X-Time-Offsets: 30, 59, 234") if used, is included as metadata either in the email header or in another location, such as the message body area, of the email message. Processing performed to send a time-offset encoded email message thereafter ends at 595.

Figure 6:
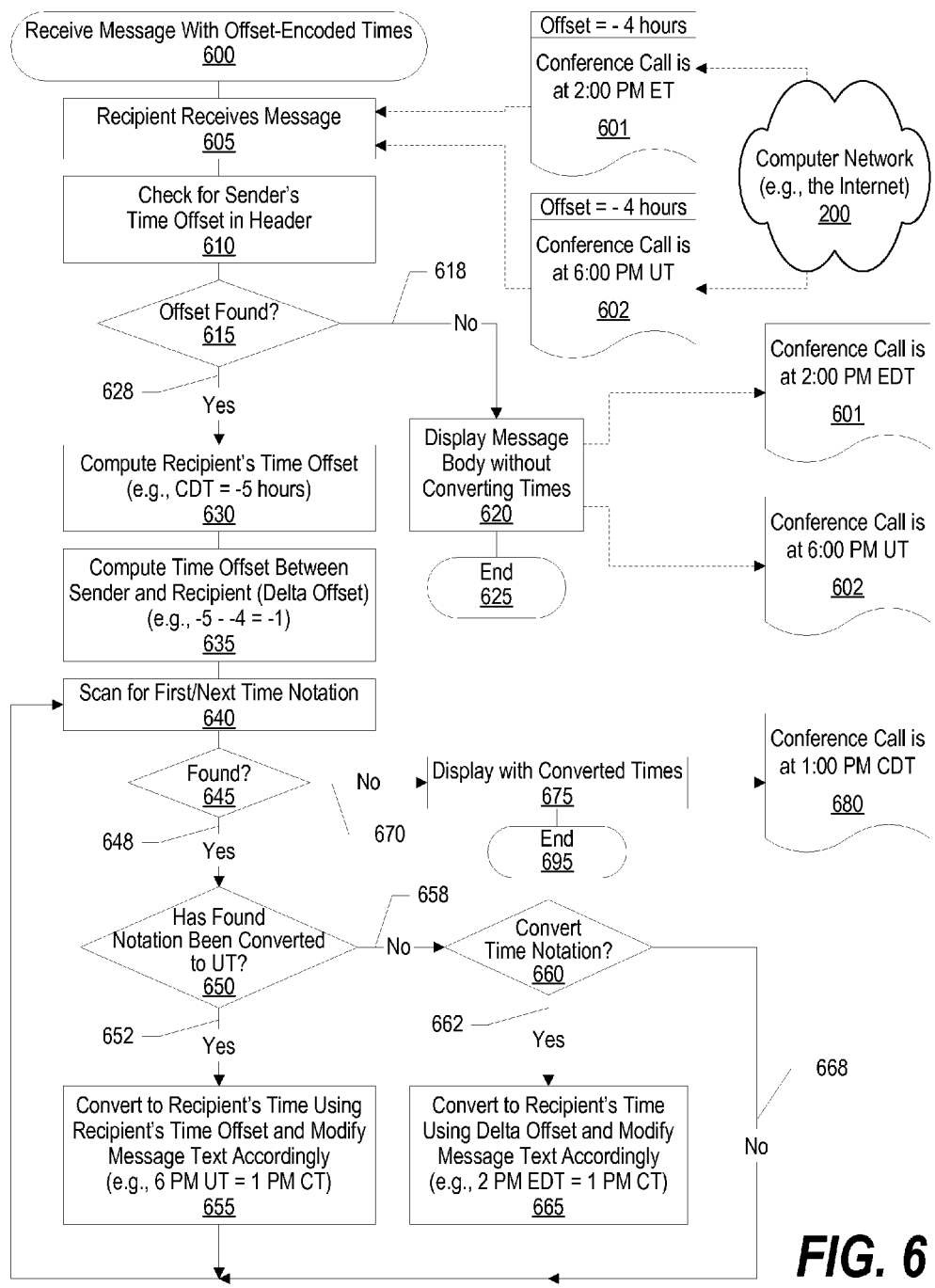
FIG. 6 is a flowchart showing steps taken to receive a time-offset encoded email message.

FIG. 6 is a flowchart showing steps taken to receive a time-offset encoded email message. Processing commences at 600 whereupon, at step 605 the recipient receives an email message at the recipient's computer system via computer network 200, such as the Internet. In the example shown, two different email messages are shown being processed, email message 601 and email message 602. Each of these email messages includes an email metadata area that indicates that the time offset between the sender's time zone and a base time zone was negative four (−4) hours. Email message 601 is an example of a time notation that is not encoded using Uniform Time Coding (UTC) (e.g., "2:00 PM EDT"), while email message 602 is an example of a message with a time notation that is in UTC (e.g., "6:00 PM UT").

At step 610, a check is made for the sender's time offset in the email metadata area (e.g., the email header). A determination is made as to whether the time offset was found in the metadata area (decision 615). If a time offset was not found, then decision 615 branches to "no" branch 618 whereupon, at step 620, the email message is displayed without converting any times that may be encoded in the message body and processing thereafter ends at 625.

On the other hand, if a time offset was found in the metadata area, then decision 615 branches to "yes" branch 628 whereupon, at step 630, the recipient's time offset is computed, the offset being the number of hours between the recipient's time zone (e.g., Central Time Zone) and the base time zone (e.g., Universal Time (UT)). At step 635, a total time offset value is computed. The total time offset value being a value that represents the offset between the sender's time zone and the recipient's time zone. Using the example where the sender's time zone is the Eastern Time Zone (with an offset of −4 hours) and the recipient's time zone is the Central Time Zone (with an offset of −5 hours), the total time offset value would be negative one (−1) hours (−5 minus −4 equals −1).

At step 640, the email body is scanned for the first time notation. If character offsets were provided in the incoming email message (e.g., "Character-Time-Offsets: 30, 59, 234") then, rather than scanning for the convertible times, the character positions of the convertible times as set forth in the Character-Time-Offsets tag are used to identify the locations of the convertible time notations, rather than attempting to identify the convertible time notations based upon semantics or syntax. A determination is made as to whether a time notation was found (decision 645). If a time notation was found, a determination is made as to whether the time notation was already converted to UTC format (e.g., UT time) at decision 650. If the time notation that has been found has been converted to UTC format, then decision 650 branches to "yes" branch 652 whereupon, at step 655, the time that has been encoded in UTC format is converted to the recipient's time zone and the email message text is modified accordingly. The "total time offset value" used in step 655 is the offset (number of hours) between the recipient's time zone and the base time zone. For example, using incoming email message 602 that includes email message body text indicating that a conference call is scheduled for "6:00 PM UT", the time would be converted to the recipient's local time and displayed accordingly. If the recipient's local time zone is the Central Time Zone (CT), then the recipient's time offset from the base time zone, in this case −5 hours between CT and UT, would be applied to the time encoded text. In this example, the resulting text would be that the conference call is scheduled for "1 PM CT".

On the other hand, if the time notation has not been converted to UTC format, such as incoming email message 601, then decision 650 branches to "no" branch 658 whereupon another determination is made as to whether to convert the time notation (decision 660). In one embodiment, the decision as to whether to convert a time notation that is not in UTC format is based on a user preference (e.g., configuration setting, user response to a prompt, etc.). If the time notation that has not been converted to UTC format is to be converted to the recipient's time zone, then decision 550 branches to "yes" branch 662 whereupon, at step 665, the computed time offset between the sender's computer system and the recipient's computer system (the delta offset computed in step 635) is used as the "total time offset value" to convert the time notation found in the email message body. Using the example message 601 that noted that the conference call is scheduled for 2:00 PM ET, step 665 would use a total time offset value of negative one (−1) to convert "2:00 PM ET" to "1:00 PM CT" and this converted time would be displayed to the recipient. On the other hand, if the determination made at decision 660 is to not convert the time notation, then decision 660 branches to "no" branch 668 thereby bypassing both conversion steps 655 and 665. "No" branch 668 would generally be taken when the time notation is not convertible. An example of a non-convertible time would be an email message that indicates that "employees at each office are expected to arrive at work no later than 8:00 AM." Obviously, the starting time for each office is intended to be at 8:00 AM in the recipients' local time zones.

After the found time notation has been processed, processing loops back to step 640 in order to scan for the next time notation. If another time notation is found in the body area of the email message, the time notation is processed as described above. Processing of time notations continues in this fashion until no further time notations are found, at which point decision 645 branches to "no" branch 670 whereupon, at step 675, the email is displayed with converted time notations that resulted from the processing of time notations. Processing used to receive a time-offset encoded email message thereafter ends at 695.

One of the preferred implementations of the invention is a client application, namely, a set of instructions (program code) or other functional descriptive material in a code module that may, for example, be resident in the random access memory of an information handling system, such as a computer system. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving, at a recipient's computer system, an email message from a sender's computer system, the email message including a time offset value in a metadata area of the email message, the time offset value indicating a number of hours between a first time zone used at the sender's computer system and a base time zone, wherein the metadata area of the email message is a header included in the email message, and wherein the base time zone is Universal Time (UT);
   computing, based on the received time offset value and a second time zone that is used at the recipient's computer system, a total time offset value;
   converting one or more time notations included in a body area of the email message to the second time zone by applying the computed total time offset value to the one or more time notations, the converting resulting in one or more converted time notations, wherein the time notations included in the body area of the email message include a first time zone indicator that indicates that the time notations correspond to the first time zone;
   adding a time zone indicator that indicates the second time zone to each of the converted time notations; and
   displaying the body area of the email message with the one or more converted time notations and the added time zone indicators on a display device attached to the recipient's computer system.

2. The method of claim 1 wherein the converting further comprises:
   calculating a recipient time offset value that is a second number of hours between the second time zone and the base time zone; and
   computing the total time offset value as being a sum of the recipient time offset value and the received time offset value.

3. The method of claim 1 wherein the converting further comprises:
   retrieving the time offset value from the metadata area of the email message;
   retrieving one or more character offset values from the email message, wherein each of the character offset values corresponds to a character location of one of the time notations in the body area of the email message;
   identifying each of the time notations based on the time notation's character location included in the character offset values;
   calculating a recipient time offset value that is a second number of hours between the second time zone and the base time zone; and
   computing the total time offset value by combining the recipient time offset value and the received time offset value.

4. A information handling system comprising:
   one or more processors;
   a memory accessible by at least one of the processors;
   a nonvolatile storage area accessible by at least one of the processors;
   a display device attached accessible by at least one of the processors;
   a network interface that connects the information handling system to a computer network; and
   a set of instructions stored in the memory and executed by at least one of the processors in order to perform actions of:
      receiving, at the network interface, an email message from a sender's computer system, the email message including a time offset value in a metadata area of the email message, the time offset value indicating a number of hours between a first time zone used at the sender's computer system and a base time zone, wherein the metadata area of the email message is a header included in the email message, and wherein the base time zone is Universal Time (UT);
      computing, based on the received time offset value and a second time zone that is used at the recipient's computer system, a total time offset value;
      converting one or more time notations included in a body area of the email message to the second time zone by applying the computed total time offset value to the one or more time notations, the converting resulting in one or more converted time notations, wherein the time notations included in the body area of the email message include a uniform time zone indicator that indicates that the base time zone corresponds to each of the time notations that are converted to the converted time notations;

adding a time zone indicator that corresponds to the second time zone to each of the converted time notations; and displaying the body area of the email message with the one or more converted time notations and the added time zone indicators on the display device.

5. The information handling system of claim 4 wherein the set of instructions that perform the converting perform further actions comprising:

calculating a recipient time offset value that is a second number of hours between the second time zone and the base time zone; and computing the total time offset value as being the recipient time offset value.

6. A computer program product stored in a computer memory, comprising functional descriptive material that, when executed by an information handling system, causes the information handling system to perform actions that include:

receiving, at a recipient's computer system, an email message from a sender's computer system, the email message including a time offset value in a metadata area of the email message, the time offset value indicating a number of hours between a first time zone used at the sender's computer system and a base time zone, wherein the metadata area of the email message is a header included in the email message, and wherein the base time zone is Universal Time (UT);

computing, based on the received time offset value and a second time zone that is used at the recipient's computer system, a total time offset value;

converting one or more time notations included in a body area of the email message to the second time zone by applying the computed total time offset value to the one or more time notations, the converting resulting in one or more converted time notations, wherein the time notations included in the body area of the email message include a first time zone indicator that indicates that the time notations correspond to the first time zone;

adding a time zone indicator that indicates the second time zone to each of the converted time notations; and displaying the body area of the email message with the one or more converted time notations and the added time zone indicators on a display device attached to the recipient's computer system.

7. The computer program product of claim 6 further comprising functional descriptive material that causes the data processing system to perform additional actions that include:

calculating a recipient time offset value that is a second number of hours between the second time zone and the base time zone; and computing the total time offset value as being a sum of the recipient time offset value and the received time offset value.

8. The computer program product of claim 6 wherein the converting further includes functional descriptive material causes the data processing system to perform additional actions comprising:

retrieving the time offset value from the metadata area of the email message;

retrieving one or more character offset values from the email message, wherein each of the character offset values corresponds to a character location of one of the time notations in the body area of the email message;

identifying each of the time notations based on the time notation's character location included in the character offset values;

calculating a recipient time offset value that is a second number of hours between the second time zone and the base time zone; and computing the total time offset value by combining the recipient time offset value and the received time offset value.

\* \* \* \* \*